(12) United States Patent
Broussard

(10) Patent No.: US 12,221,297 B2
(45) Date of Patent: Feb. 11, 2025

(54) CROSS PLATFORM VALVE BLOWER MODULE

(71) Applicant: John Neal Broussard, Corinth, TX (US)

(72) Inventor: John Neal Broussard, Corinth, TX (US)

( * ) Notice: Subject to any disclaimer, the term of this patent is extended or adjusted under 35 U.S.C. 154(b) by 89 days.

(21) Appl. No.: 18/143,045

(22) Filed: May 3, 2023

(65) Prior Publication Data

US 2023/0356963 A1    Nov. 9, 2023

Related U.S. Application Data

(60) Provisional application No. 63/364,264, filed on May 5, 2022.

(51) Int. Cl.
  *B65G 51/16*   (2006.01)
  *F16K 31/04*   (2006.01)

(52) U.S. Cl.
  CPC ............ B65G 51/16 (2013.01); *F16K 31/042* (2013.01)

(58) Field of Classification Search
  CPC .............................. B65G 51/16; F16K 31/042
  See application file for complete search history.

(56) References Cited

U.S. PATENT DOCUMENTS

| | | | |
|---|---|---|---|
| 3,232,559 A * | 2/1966 | Grosswiller, Jr. ...... | B65G 51/34 406/111 |
| 3,237,881 A * | 3/1966 | Grosswiller, Jr. ...... | B65G 51/04 406/84 |
| 3,836,288 A * | 9/1974 | Evans ..................... | B65G 53/28 417/442 |
| 4,710,098 A * | 12/1987 | Anders .................. | B65G 51/12 415/150 |
| 4,971,481 A | 11/1990 | Foreman | |
| 5,562,367 A * | 10/1996 | Scott ...................... | B65G 51/34 406/16 |
| 5,735,644 A | 4/1998 | Grosswiller et al. | |
| 6,039,510 A | 3/2000 | Greene et al. | |
| 6,592,302 B2 | 7/2003 | Balko | |
| 6,652,198 B2 | 11/2003 | Nickoson | |
| 7,153,065 B2 * | 12/2006 | Lowell ................... | B65G 51/16 406/176 |
| 8,317,432 B2 | 11/2012 | Castro et al. | |
| 8,500,373 B1 | 8/2013 | Epps | |
| 2010/0166509 A1 | 7/2010 | Brown | |
| 2016/0137431 A1 | 5/2016 | Bizhanzadeh | |
| 2021/0164464 A1 | 6/2021 | Tanaka et al. | |

* cited by examiner

*Primary Examiner* — William R Harp
(74) *Attorney, Agent, or Firm* — Guy V. Manning

(57) ABSTRACT

A pressure and vacuum generating module for a carrier transport system includes a combined blower, air chamber and rotating valve module which alternately couples a pressure chamber and a vacuum chamber to the carrier transport system, creating high or low pressure regions which move a transport carrier. The valve repositions a baffle which blocks one or the other of the chambers, or both chambers, the latter for breaking and landing of the carrier. With a chassis that includes the blower motor, air chamber and valve, the module is adapted for new construction as well as for retrofitting and replacing older legacy blower modules.

23 Claims, 17 Drawing Sheets

PRESSURE POSITION

VACUUM POSITION

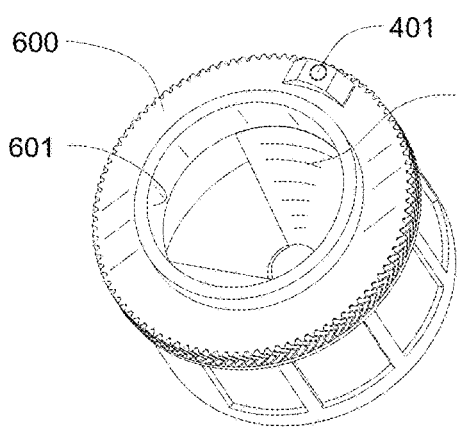
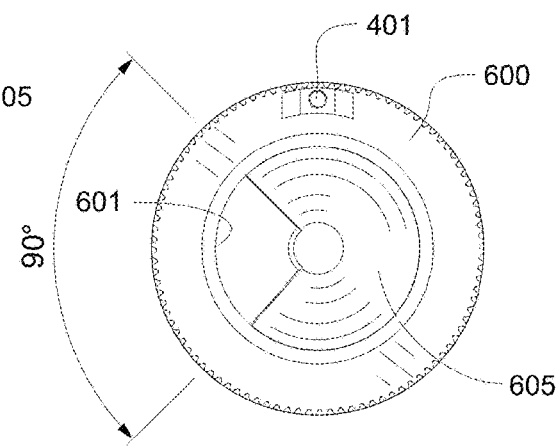
FIG. 6A  FIG. 6B
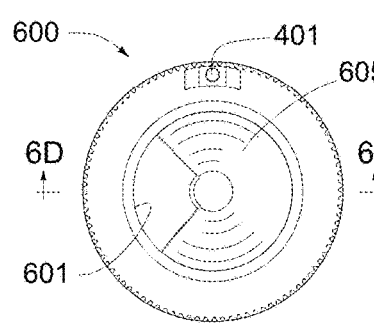
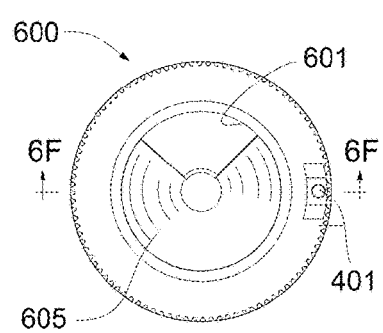
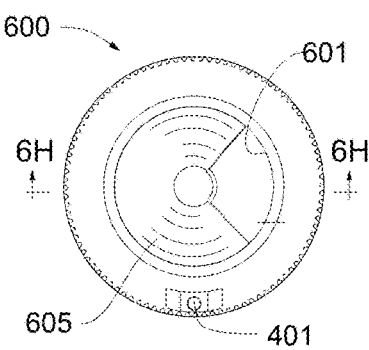
FIG. 6C  FIG. 6E  FIG. 6G
PRESSURE POSITION  BLOCK POSITION  VACUUM POSITION
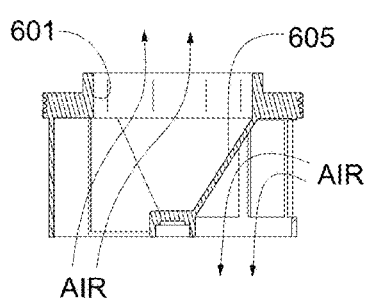
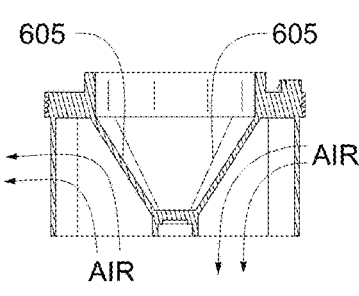
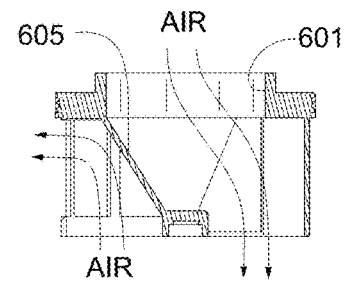
FIG. 6D  FIG. 6F  FIG. 6H

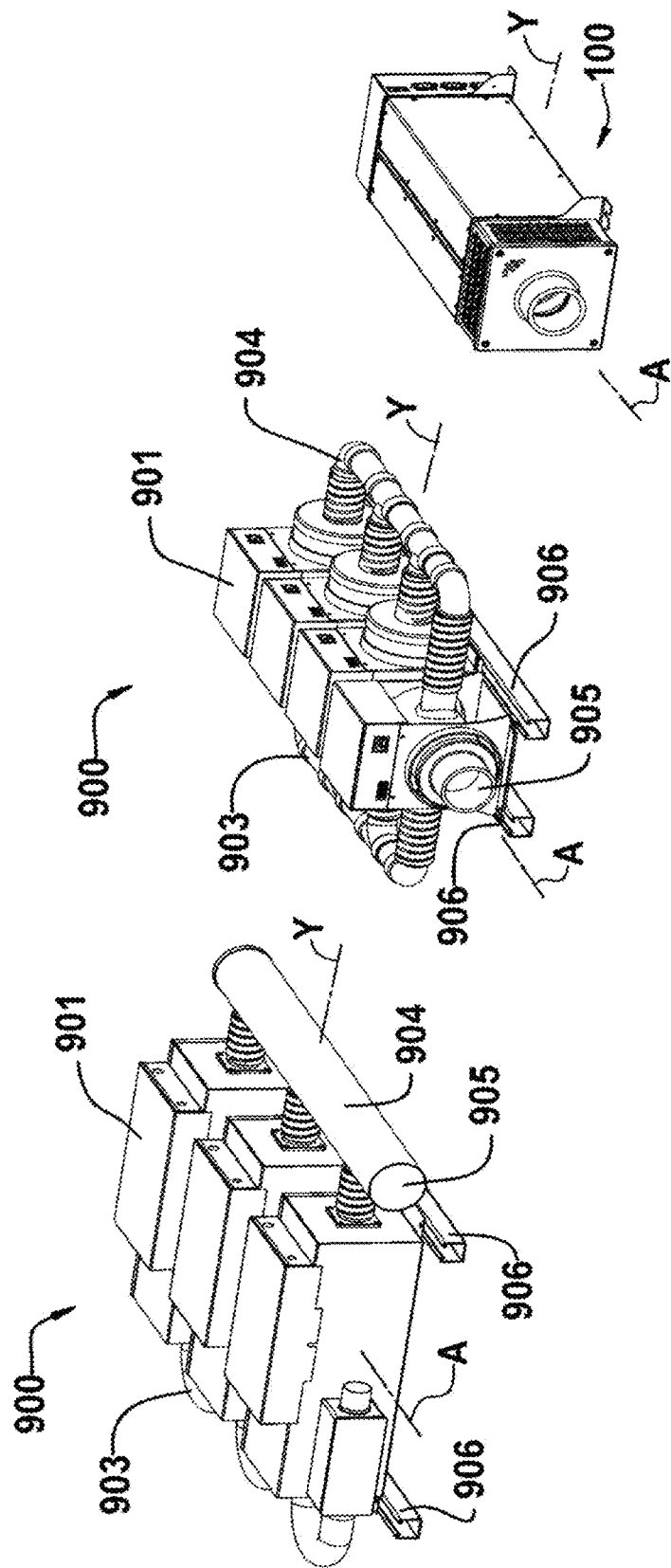

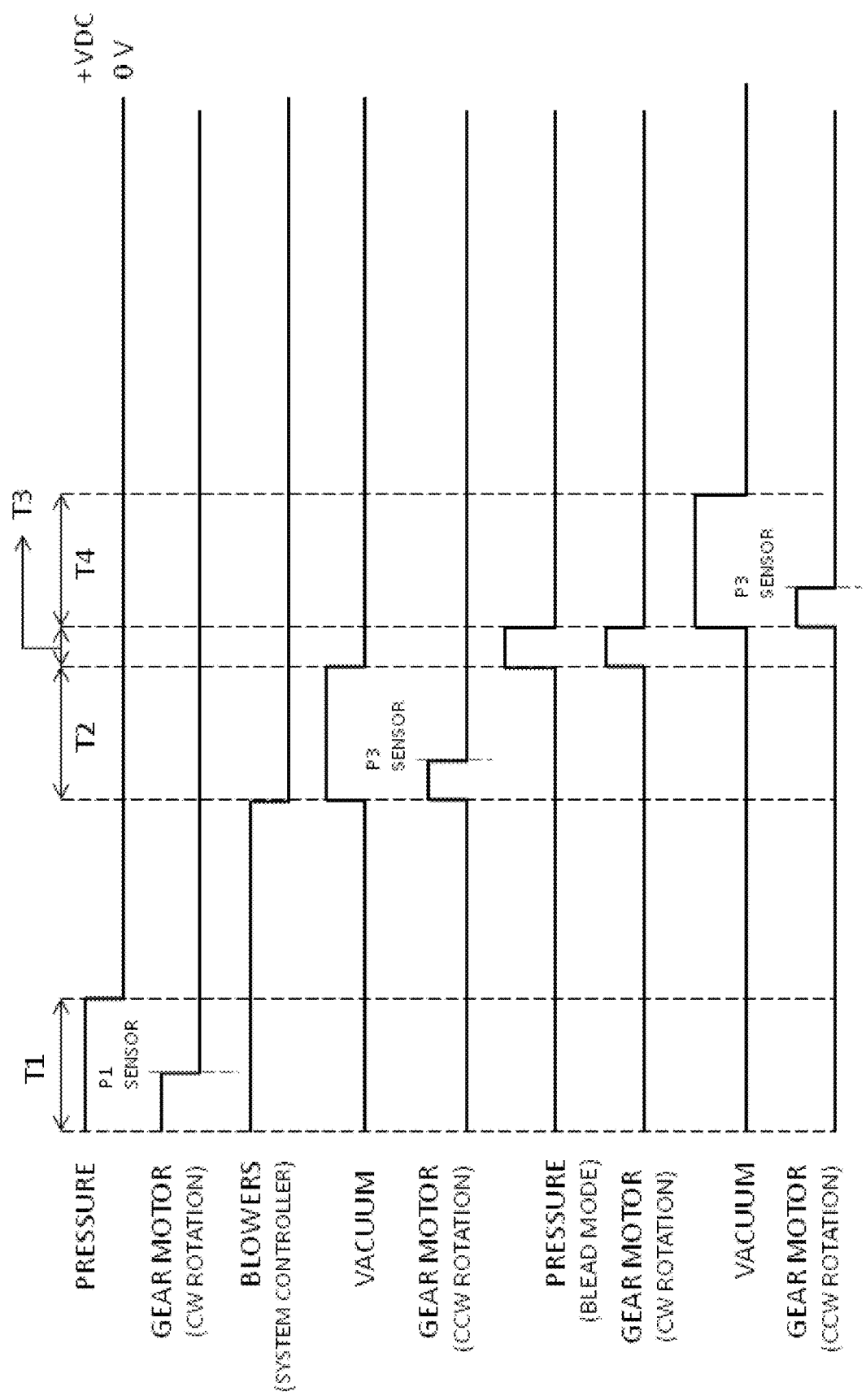

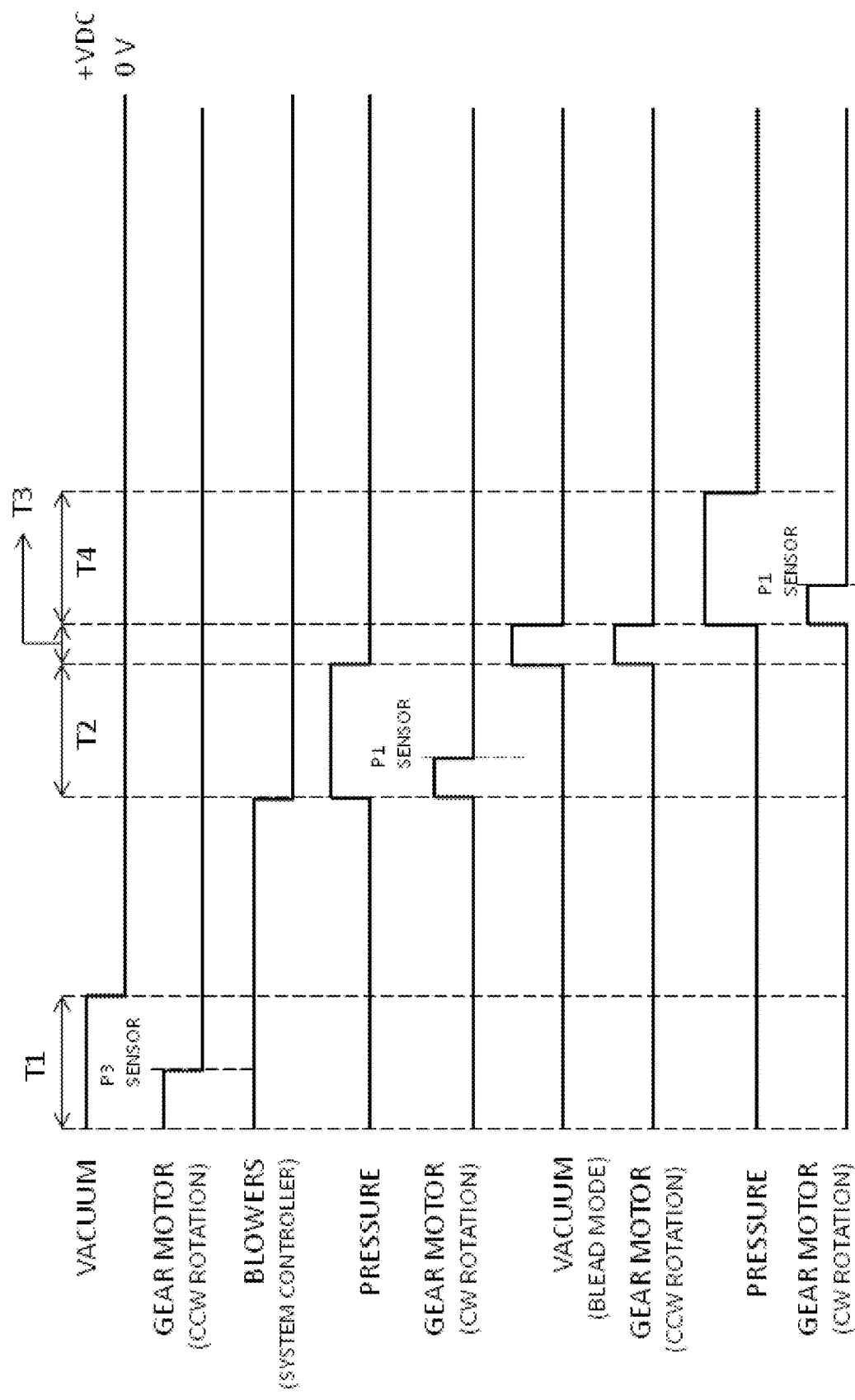

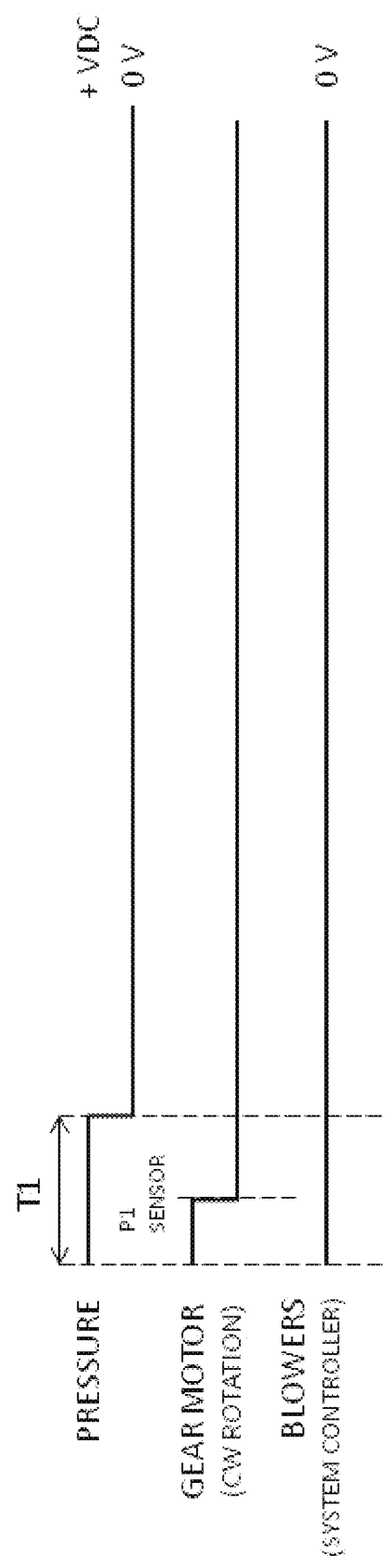

CROSS PLATFORM VALVE BLOWER MODULE

CROSS REFERENCE TO RELATED APPLICATIONS

This application claims domestic benefit from U.S. Provisional Appl. Ser. No. 63/364,264 filed May 5, 2022, which is hereby incorporated by reference herein in its entirety.

BACKGROUND OF THE INVENTION

1. Field of the Invention

This invention relates generally to pneumatic tube carrier systems and particularly to a system and method for improved carrier handling in a pneumatic tube carrier system. More particularly, this invention relates to a cross platform valve blower module for pneumatic tube carrier systems.

2. Description of Related Art

A typical pneumatic transport system includes a primary terminal connected through tubing or conduit to at least one satellite terminal. A blower module, typically housed with the primary terminal, supplies pressured air into the tubing to move a pneumatic carrier between the primary terminal and the satellite terminal. Another separate blower reverses the pressure differential across the carrier to return the carrier to the primary terminal.

Most legacy blower modules for such systems have two or more sections for different air flow directions: a pressure area created by one blower motor and a vacuum area created by another blower motor, each system including a control device for each blower motor. Air flow direction within the system can be changed by alternately operating the pressure motor(s) and the vacuum motor(s). See FIG. 10A.

Other systems include one or more external valves with separate manifold connections to direct air into the tubing system to pressurize it or to direct air out of the tubing system to create a vacuum. See FIG. 10B. To land the carrier softly at either terminal, a supply shut off valve closes the air supply to the tubing system, causing air pressure on one side of the carrier to drop as the volume of that side increases while the carrier moves through the tubing.

An inherent problem exists with such configurations. In the first example (FIG. 10A), the energized blower motor(s) pull air through those that are not energized, causing the latter to spin in reverse. This often damages motor contactors and decreases blower life. In the second example (FIG. 10B), increasing the amount of air flow into the system requires additional blower motor modules and a larger manifold size, which in turn increases weight and complexity of the installation.

A further problem with the external manifold configuration is that the air flow is restricted at connection points. This increases air flow impedence within the system, requiring larger, more expensive blower motors than otherwise would be needed, and results in increased wear on the blower motors.

A need exists for means to solve the inherent defects described above, including reducing the size and weight of the blower module, reducing air restriction and increasing air flow.

SUMMARY OF THE INVENTION

A combined pressure and vacuum generating module for a carrier transport system includes a blower, air chamber and rotating valve module which alternately couples a pressure chamber and a vacuum chamber to the carrier transport system, creating high or low pressure regions which move a transport carrier. The valve repositions a baffle which blocks one or the other of the chambers, or both chambers, the latter for breaking and landing of the carrier. With a chassis that includes the blower motor, air chamber and valve, the module is adapted for new construction as well as for retrofitting and replacing older legacy blower modules.

BRIEF DESCRIPTION OF THE DRAWINGS

The novel features believed characteristic of the present invention are set forth in appended claims. The invention, as well as a preferred mode of use and further objects and advantages thereof, further will be understood by reference to the following detailed description of one or more illustrative embodiments when read in conjunction with the accompanying drawings, wherein:

FIGS. 6A, 6B are perspective and top views, respectively, of the air valve of FIG. 6.

FIGS. 6C, 6E, 6G are alternate front elevation views, showing three air flow positions, of the air valve of FIGS. 6A, 6B.

FIGS. 6D, 6F, 6H, are alternate section views as indicated in FIGS. 6C, 6E, 6G, respectively, illustrating resulting air flow paths through the air valve of FIGS. 6A, 6B, positioned alternately as shown in FIGS. 6C, 6E, 6G respectively.

FIGS. 10A, 10B show alternate prior art devices, approximately to scale alongside the blower module of FIG. 1 (FIG. 10C) to illustrate configuration and size comparisons of the present invention with devices it is designed to replace.

FIGS. 13A-13C show system timing diagrams for the blower module of FIG. 1.

DETAILED DESCRIPTION OF THE INVENTION

The following detailed description of one or more particular, exemplary embodiments illustrates the principles of the invention. The provided embodiments illustrate varying aspects of the invention, but the invention is not limited to any particular embodiment shown, nor to all such embodiments. The scope of the description encompasses alternatives, modifications and equivalents, but the invention is limited only by the claims and may be practiced according to the claims without some or all of the details shown. Some technical details related to the field of the invention may have been omitted to avoid unnecessarily eclipsing the invention.

System Architecture

Figure 9A:
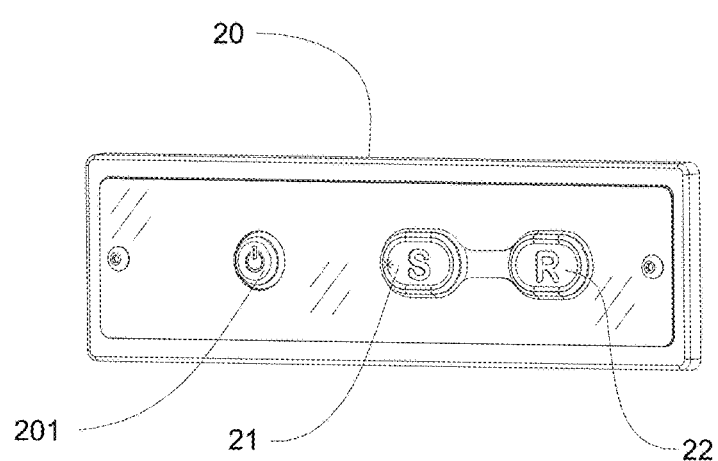
FIG. 9A details a user interface for controlling the pneumatic tube system of FIG. 9 during operation.
Figure 9:
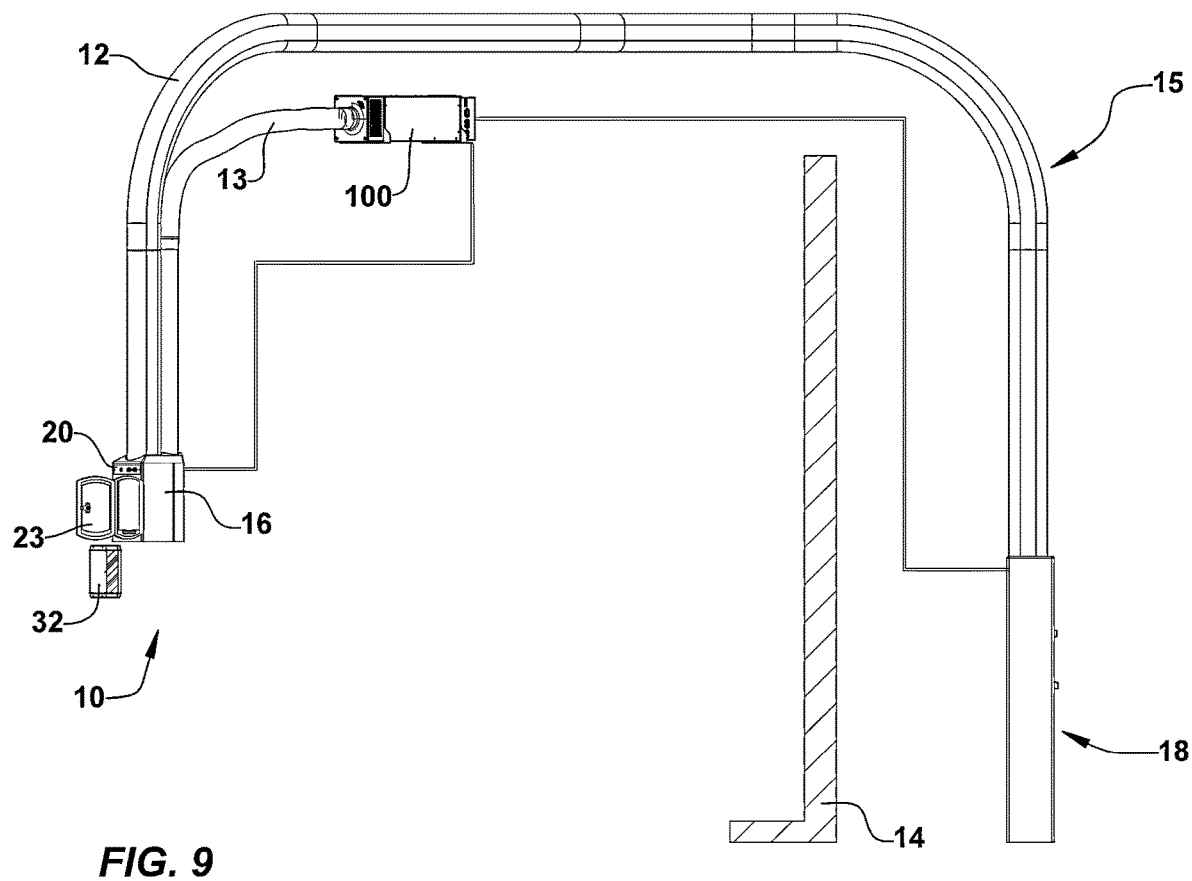
FIG. 9 shows a schematic of a typical pneumatic tube system used with the present invention.

Referring now to the figures and particularly to FIG. 9, conventional carrier transport system 10 includes satellite terminal 18 positioned outside building 14. Terminal 18 typically is an external station where customers (not shown) of a business may place items (not shown) into pneumatic carrier 32 for transport into building 14 and retrieve such items sent to them through transport system 10's connecting pneumatic tubing 15. At the opposite ends of pneumatic tubing 15, indoor primary originating terminal 16 and opposite outdoor satellite terminal 18 receive carrier 32, which is accessible through access ports 23. Such a system might be employed, for example, by banks or pharmaceutical dispensers, where security inside building 14 is of concern while the passing of money or prescription items between the business inside building 14 and its customers outside is desired. One having ordinary skill in the art will recognize that system 10 could have other applications as well, such as transport of physical objects between stations within a business or building, and that all such configurations are considered within the scope of the present invention.

Carrier 32 comprises a hollow, commonly cylindrical container congruent with tubing 15 and having an interior adapted to receive and transport items, the interior accessible through a hatch door (not shown). Annular seals (not shown) surrounding both ends of carrier 32 engage the interior walls of tubing 15 pneumatically to seal tubing 15, thus enabling system 10 to vary the relative air pressures within tubing 15 on either side of carrier 32. Said annular seals enable carrier 32 to fit inside tubing 15 snugly enough to enable such an air pressure differential to exist, but not so snugly that carrier 32 is unable to move smoothly and quickly between terminals 16, 18 despite being laden with items inside carrier 32.

As system 10 creates said air pressure differential, discussed in more detail below, carrier 32 moves within tubing 15 toward the lower pressure region, thus propagating it through tubing 15 at a pre-determined speed relative to the pressure differential. As carrier 32 approaches one of terminals 16, 18, system 10 reduces and may even reverse the air pressure differential sufficiently to slow and then stop carrier 32, effecting a "soft" landing at terminals 16, 18. To return carrier 32, system 10 reverses the air pressure differential, thus drawing carrier toward opposite terminal 16, 18. The apparatus and method of achieving this process are discussed in more detail below.

Blower Module

Referring now also to FIGS. 1-4, and FIGS. 10A-10C, cross platform valve blower module 100 comprises an air supply and pressure differential generator for system 10. Module 100 may be included with a new design for system 10, but it also can be substituted into an existing, legacy system 10 to replace prior art blower modules (see, e.g., FIGS. 10A, 10B). One having ordinary skill in the art will recognize that, with proper modifications (not shown) to system 10 and capacity adjustments (discussed below) to module 100, module 100 may replace other legacy blowers beyond those shown in FIGS. 10A, 10B without departing from the scope of the present invention. For example, for legacy prior art blower modules 900 of FIGS. 10A, 10B, individual blower motors 901 are positioned to charge manifolds 903, 904 positioned a spaced distance on either side of axis A. Module 100 by contrast, is adapted to be installed symmetric about axis A and occupy considerably less physical space, with concomitant reductions in weight and cost.

Figure 1:
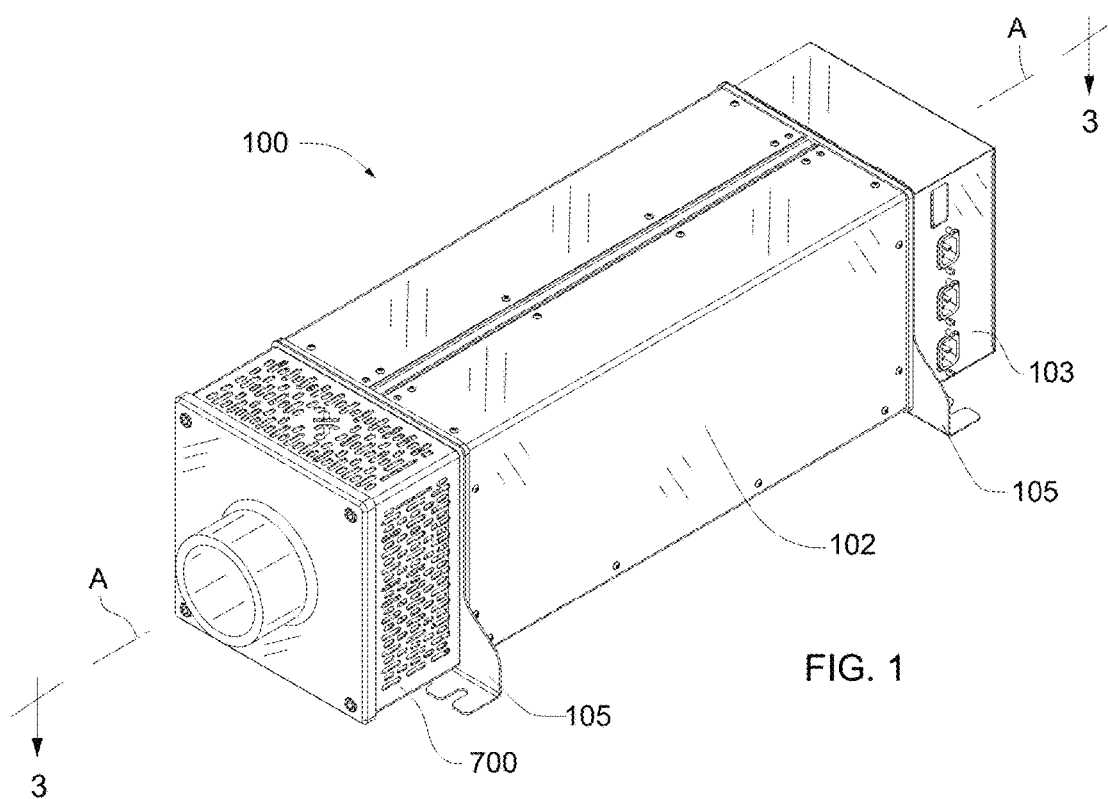
FIG. 1 is a perspective view of a cross platform valve blower module according to the present invention.
Figure 2:
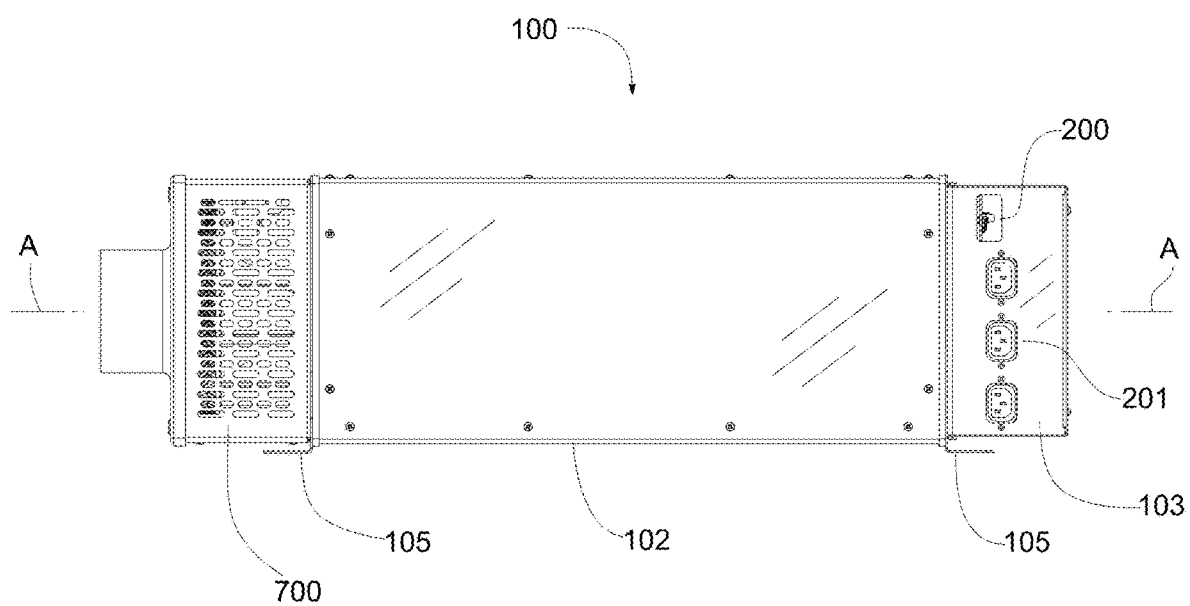
FIG. 2 is a right side elevation view of the blower module of FIG. 1.
Figure 7A:
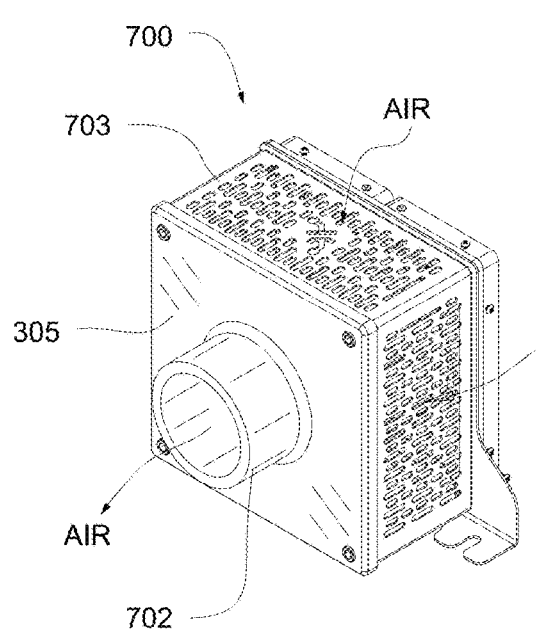
FIGS. 7A, 7B are perspective views of two alternate ambient air inlet and outlet housings of the blower module of FIG. 1.
Figure 7B:
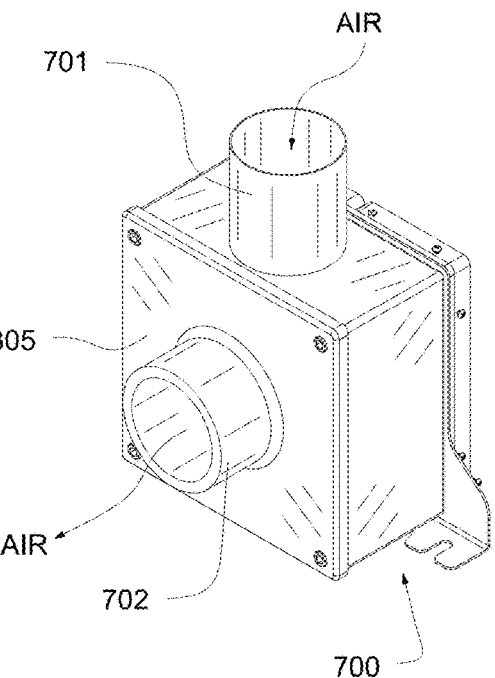

Referring particularly to FIGS. 1 and 2, and also to FIGS. 7A and 7B, module 100 comprises three major components arrayed linearly along axis A. Air chamber 102, containing a plurality of blower motors 306 (FIGS. 3, 4) and pressure and vacuum chambers 302 and 303, respectively, are disposed between control module 103 and air flow control valve housing 700. Module 100 may be provided with mounting hardware such as tabs 105 for affixing it to a larger system 10 chassis or frame (not shown).

Figure 11C:
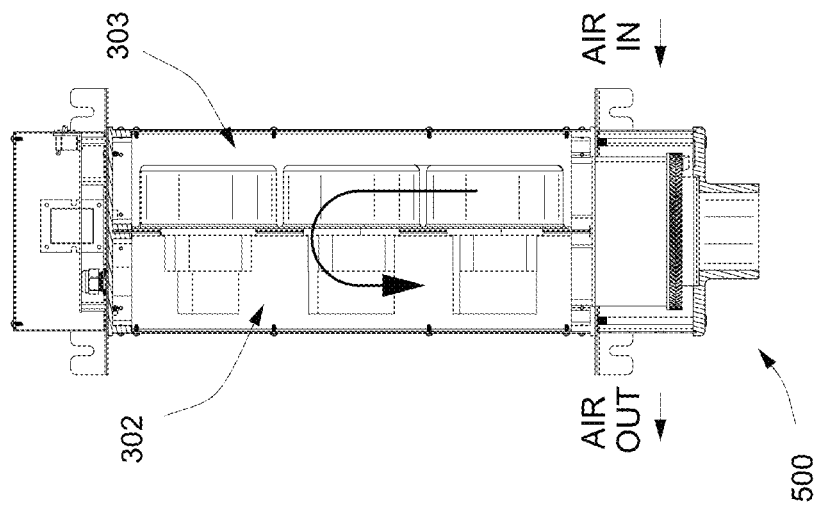
FIGS. 11A-11C illustrate vacuum, pressure and blocking mode operations, respectively, of the valves of FIGS. 5A, 6A.
Figure 11B:
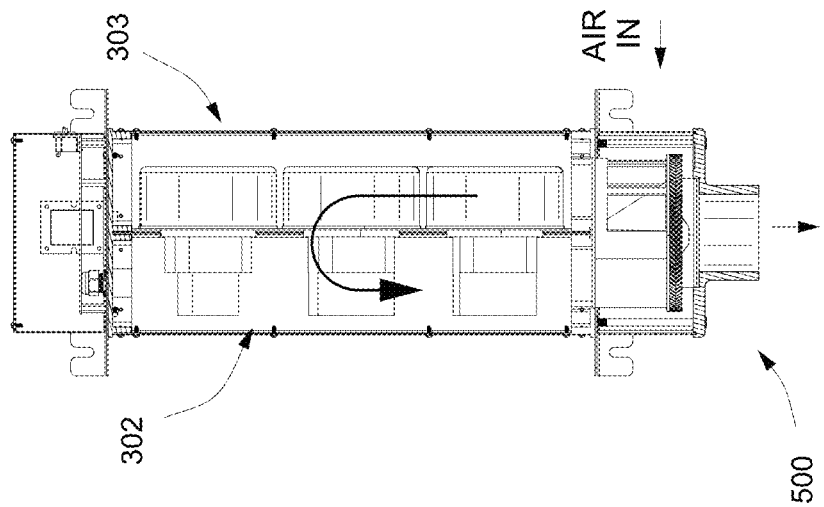
Figure 11A:
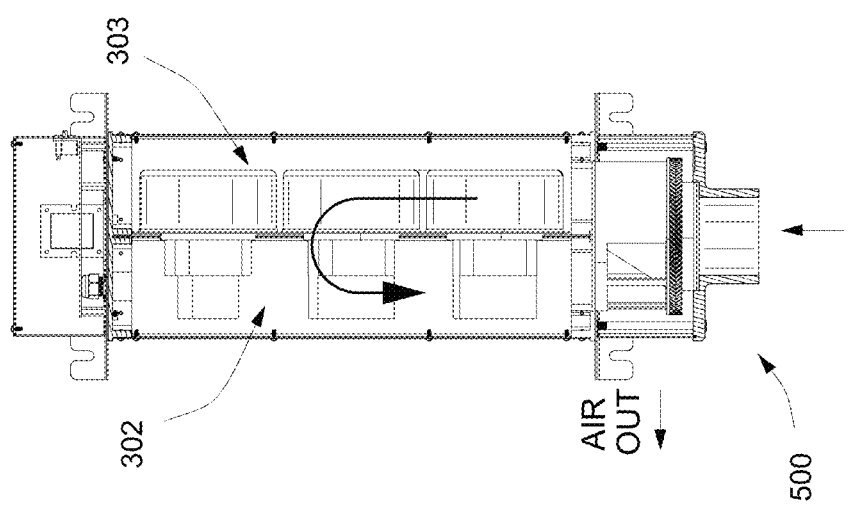

As best seen in FIGS. 7A, 7B, as well as FIGS. 11A, 11B, an appropriate quantum of ambient air preferably is accessible for air chamber 102 through valve housing 700. In a particular embodiment, such ambient air access means comprises a perforated grill 703 surrounding at least a portion of valve housing 700 and adapted to admit air from, or vent system air to, ambient air surrounding valve housing 700. Alternately, and particularly where suitable ambient air may not be available juxtaposed to valve housing 700, ambient air access means may comprise one or more separate air intake ducts provided for the purpose which admit and vent air through valve housing 700 by way of ambient air port 701. Herein after, reference to coupling system air flow to ambient air through valve housing 700 will, unless otherwise indicated, refer to venting or drawing through grid cover 703, port 701 or other suitable ambient air access means (not shown), depending upon which configuration is installed. One having ordinary skill in the art will recognize also that all such means for accessing ambient air and venting exhaust air are within the scope of the present invention.

Disposed on the end of valve housing 700, end cap 305 interfaces (FIG. 9) with tubing 15 using a pneumatically sealed coupler (not shown) adapted to couple to system air port 702. This enables module 100 to inject or withdraw air from tubing 15 as needed to propagate carrier 32 between terminals 16, 18.

On the opposite end of module 100 from end cap 305, controller module 103 contains signal 200 and power 201 inputs with which timing and on/off states of module 100 are controlled externally. See also FIG. 8. Signal 200 and power 201 connections preferably are adapted to interface with legacy control and power devices, abetting the use of module 100 with such legacy systems. One having ordinary skill in the art will recognize that power and control signal interconnections are specific to the installation and need not be specified in detail herein, and that multiple interconnecting ports (not shown) could be provided to enable a single module 100 to be deployed on a variety of legacy systems 10 with minimum effort and disruption.

Figure 3:
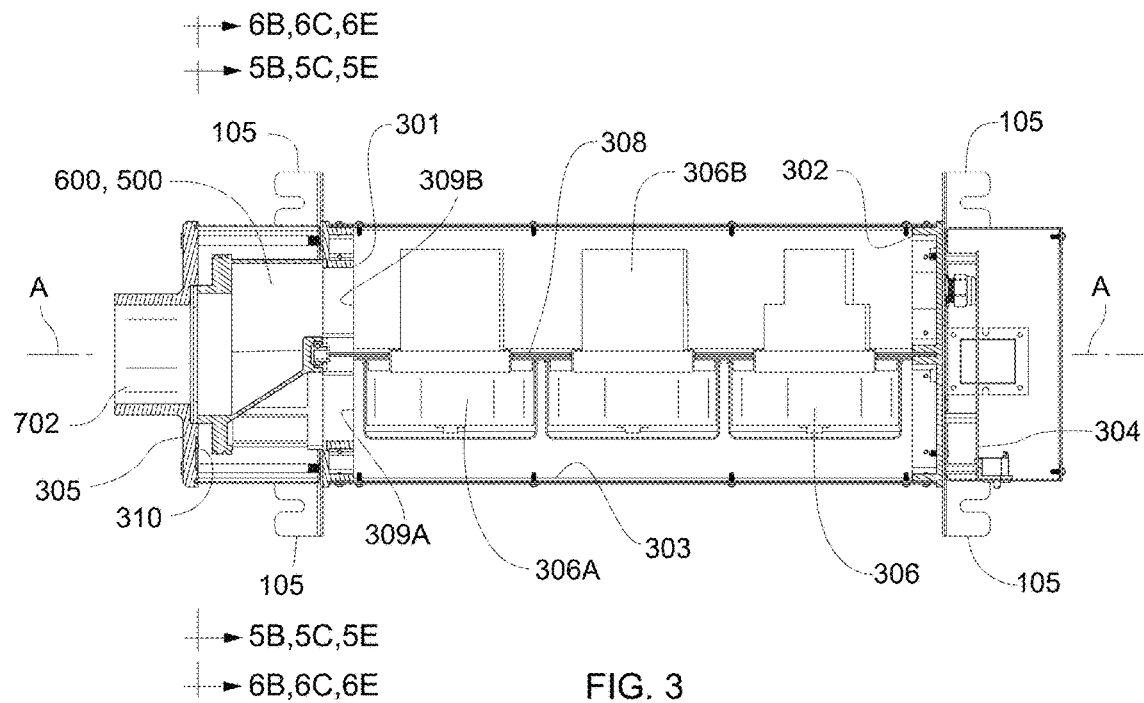
FIG. 3 is a top, plan section view of the blower module of FIG. 2 viewed as indicated in FIG. 1.
Figure 4:
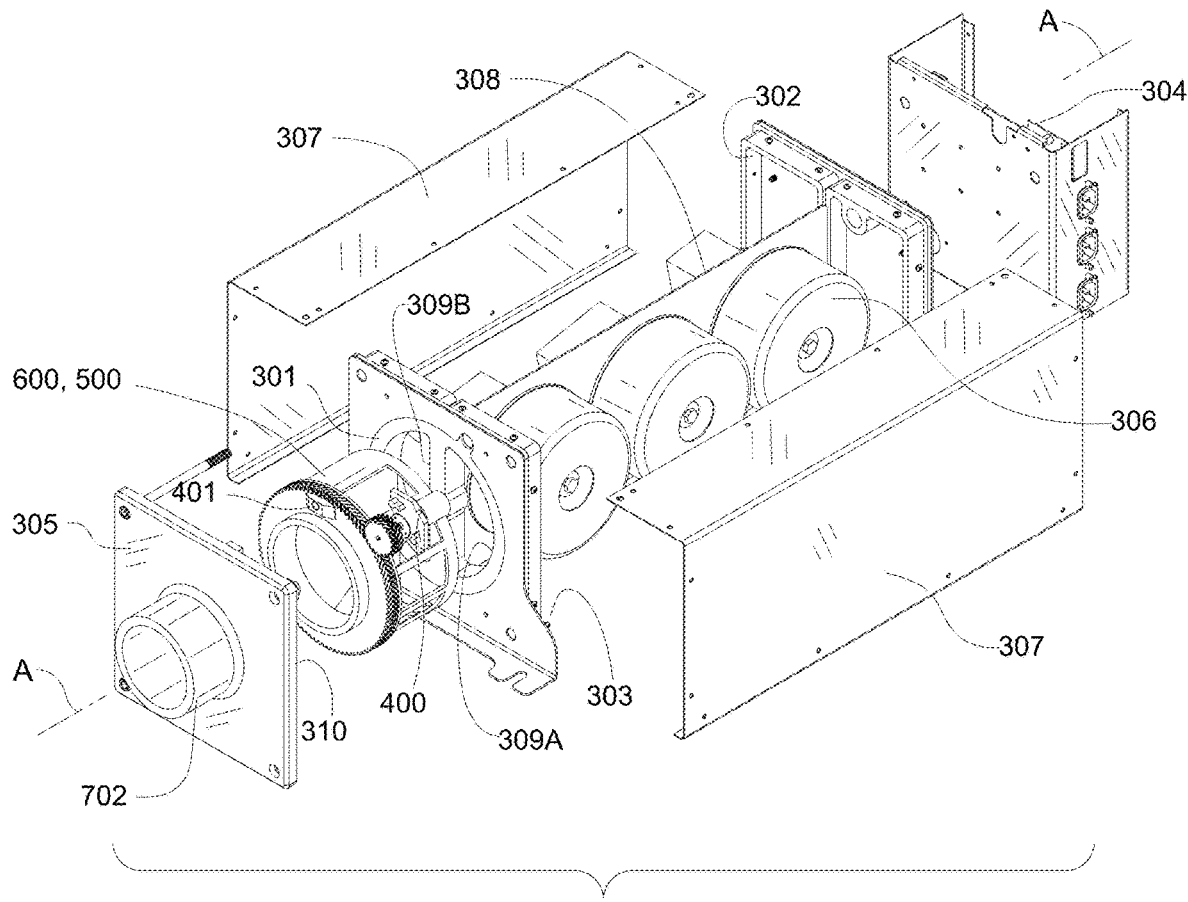
FIG. 4 is an exploded view of the blower module of FIG. 1.

In the embodiment illustrated, three blower motors 306 are disposed along longitudinal axis A within air chamber 102 and supported by longitudinal partition 308 (FIGS. 3, 4). Partition 308 divides air chamber 102 into pressure chamber 302 and vacuum chamber 303, each pneumatically sealed from the other, from control module 103, and from surrounding ambient air outside of module 100. Removable access panels 307 expose blower motors 306 for installation or maintenance, but seal air chamber 300 from ambient air surrounding module 100 when in service.

As depicted, pressure and vacuum chambers 302, 303 are substantially equivalent in size and symmetric about partition 308 and axis A, but one having ordinary skill in the art will recognize that the size and shape of chambers 302, 303 may vary in both position and size without departing from the scope of the present invention. Further partition 308 is depicted as being coaxial with axis A, but it could be configured other ways (not shown) within air chamber 102 to divide air chamber 102 into vacuum and pressure chambers 303, 302, whether or not it also supports blower motors 306.

As shown, blowers 306 penetrate partition 308 such that their blower input ends 306A are disposed within vacuum chamber 303, while their blower output ends 306B are disposed within pressure chamber 302. Thus, when blowers 306 operate, they lower air pressure within vacuum chamber 303 while simultaneously elevating air pressure within pressure chamber 302. This occurs to varying degrees depending upon the number of blowers 306 operating and the speed at which they operate. One having ordinary skill in the art will recognize that the quantity, size and arrangement of blowers 306 included within module 100 could vary from those as depicted and described above. At least one blower 306 is required, but any number of additional blowers 306 could be coupled to air chamber 102, whether or not linearly along axis A, without departing from the scope of the present invention.

Preferably, and as illustrated, each blower 306 comprises a two-stage through-flow vacuum motor and fan combination. A suitable blower 306 is available as Model 115923 from AMETEK Lamb Electric of Kent, Ohio, USA. The combined pneumatic power capacity of three blowers 306, as illustrated, is sufficient to propel carrier 32 through a typical system 10 having tubing 15 extending up to or beyond forty (40 ft.) feet, depending on the installation. For longer systems, module 100 can employ more and/or larger blowers 306. Cycle time and supply for blowers 306 is controlled by system board controller 304 which can be configured for different input terminals and connectors.

End wall 301 of air chamber 102 is not pneumatically sealed from module 100, but instead provides two air ports 309A, 309B pneumatically coupled separately to pressure and vacuum chambers 302, 303, respectively. Intake air port 309A couples to vacuum chamber 303 and provides a conduit coupling vacuum chamber 303 to valve housing 700. Output air port 309B similarly couples to pressure chamber 302 and provides access to valve housing 700 from pressure chamber 302 when appropriate. Thus, when blowers 306 operate, they draw air through intake air port 309A into vacuum chamber 303 and expel air out of pressure chamber 302 through output air port 309B. In alternative states discussed below (see FIGS. 5-6H and 11A-11C and discussion thereof), air flow valve 500 diverts air between air intakes 701, 703 and system air port 702.

Air Flow Valve

Figure 5:
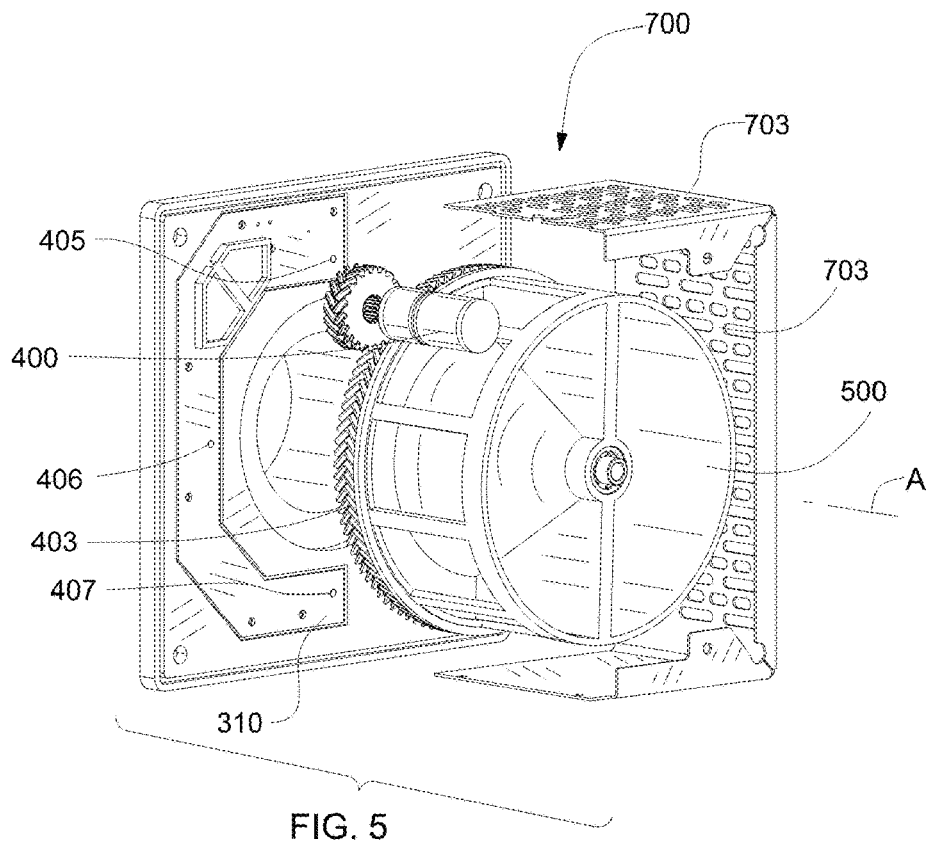
FIGS. 5 and 6 detail alternate air valves used with the blower module of FIG. 1.
Figure 5A:
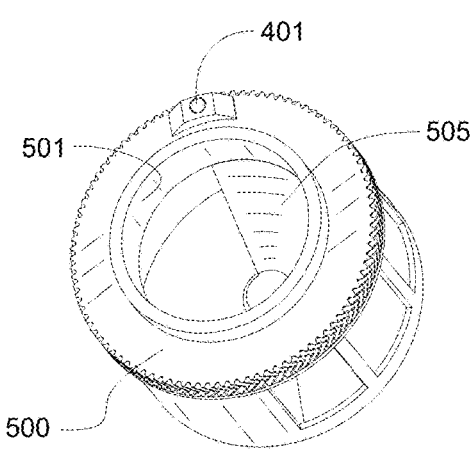
FIGS. 5A, 5B are perspective and top views, respectively, of the air valve of FIG. 5.
Figure 5B:
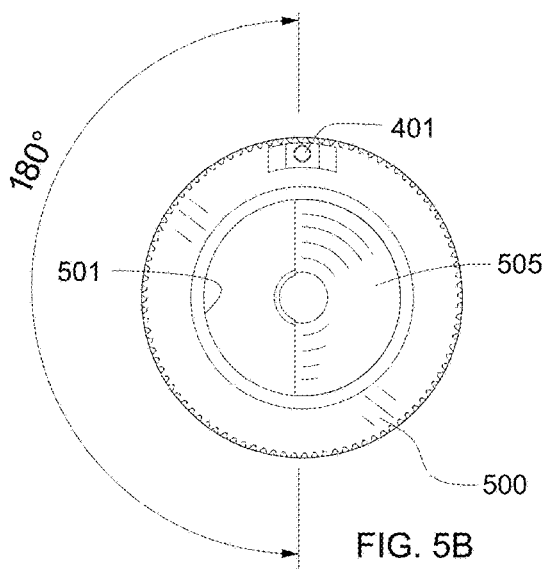
Figure 5C:
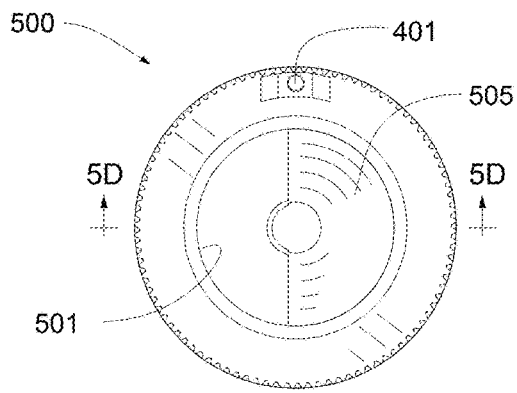
FIGS. 5C, 5E are alternate front elevation views, showing two air flow positions, of the air valve of FIGS. 5A, 5B.
Figure 5E:
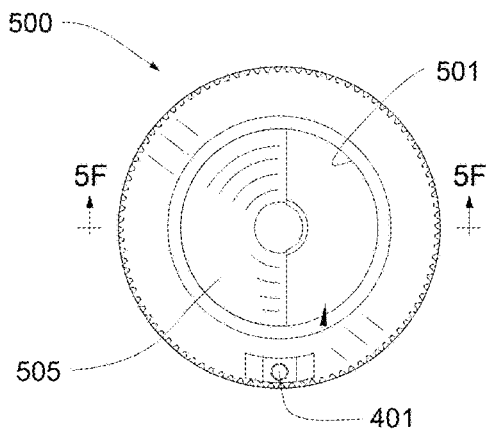
Figure 5D:
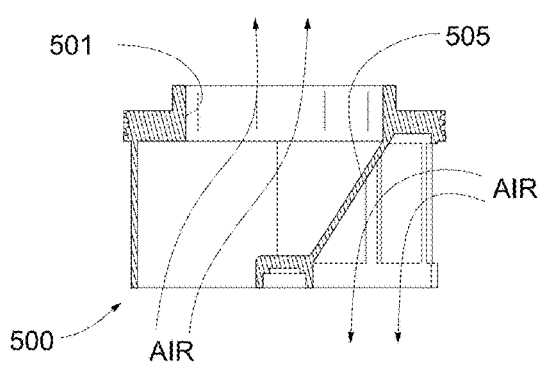
FIGS. 5D, 5F, are alternate section views as indicated in FIGS. 5C, 5E, respectively, illustrating resulting air flow paths through the air valve of FIGS. 5A, 5B positioned alternately as shown in FIGS. 5C, 5E, respectively.
Figure 5F:
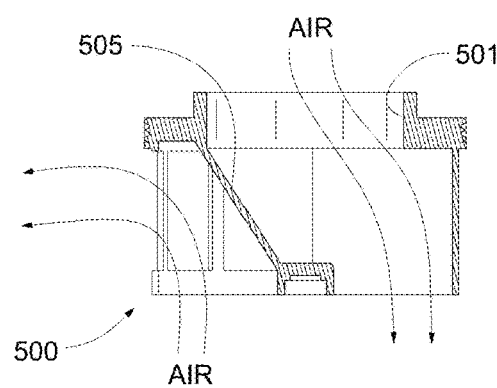

Turning now also to FIGS. 5-5F, air flow valve 500 controls the coupling of air ports 309A, 309B to system air port 702 through end cap 305. As depicted, valve 500 comprises a regular, circular cylinder having a proximate end coupled to end wall 301, and a distal end coupled to end cap 305. Valve 500 is coaxial with and substantially the same diameter as end wall 301. Valve 500 is hollow, thereby surrounding and defining air pass-through port 501 which couples air chamber 101 to tubing 15 through system air port 702. Thus, air flowing through air ports 309A, 309B flows through system air port 702 and valve 500 into carrier transport system 10, as described in more detail below. Preferably, valve 500 is coaxial with and free to rotate about axis A in response to commands from control module 304.

Air flow valve 500 is positioned by operation of gear driven DC motor 400 (FIGS. 4, 5) having drive gear 402 that engages perimeter gear 403 disposed on the perimeter of valve 500. Magnetic feedback sensor pickups 405, 406, 407 located on end cap 305 interact with magnet 401 mounted on the rim of valve 500 and communicate with controller 304 to sense the angular displacement of valve 500 about axis A. Preferably, magnet 401 is a simple, permanent, ferrous magnet of appropriate size and commonly available. Controller 304 receives inputs from said feedback sensors 405, 406, 407 about the angular displacement of magnet 401 around axis A, and from that angular displacement determines what direction and speed at which to rotate air valve 500.

Preferably, motor 400 is a 200 rpm DC Brush Gear Motor, with speed and direction controlled by a microprocessor and powered by a H-Bridge circuit of 24V DC output (neither shown), commonly available. One having ordinary skill in the art will recognize that other suitable motors 400 could be employed instead, including a stepper motor or a brushless DC gear motor, and also could operate at other commonly employed DC voltages, such as 5V DC, or 12 V DC, concomitantly using H-Bridge circuits with corresponding DC outputs, without departing from the scope of the present invention.

As best seen in FIG. 5, blocking baffle 505 disposed coaxially within valve 500 partially obstructs air pass-through port 501, thereby selectively directing air between pressure chamber 302, vacuum chamber 303, system air port 702 and ambient air access port 701, 703. As depicted, baffle 505 is generally planar in shape with a conical transition portion extending toward end cap 305. Baffle 505 also is coaxial with axis A, its apex disposed adjacent end wall 301 and its base disposed adjacent end cap 305. A portion of baffle 505 is open to permit air to pass directly between air chamber 101 and system air port 702, while the remainder is solid and adapted to block air flow, diverting the air selectively to alternate pathways depending on the position of baffle 505 relative to air chamber 101.

As depicted in FIG. 5, baffle 505 is solid for half of its 360 degree circumference, substantially matching the sizes of air intake and outlet ports 309A, 309B. In other particular embodiments, e.g. FIG. 6, baffle 605 covers three-fourths of air pass-through port 601. One having ordinary skill in the art will recognize that any configuration of baffles 505, 605 to cover any portion of air pass-through ports 501, 601 are within the scope of the present invention.

With particular reference now to FIGS. 5A-5F, valve 500 includes 180 degree (180 D) air pass through port 501 opening for air flow to air pass-through port 501. In this embodiment, substantially half of the cross section of valve 500 is open, maximizing the volume of air that can flow into and out of air chamber 102. The other half of said cross section of valve 500 is blocked by 180 D blocking baffle 505, which completely covers one of air ports 309A, 309B.

As best seen in FIGS. 5C-5F, rotation of valve 500 about axis A moves blocking baffle 505 into position to cover either intake air port 309A (FIG. 5C) or output air port 309B (FIG. 5E), depending upon whether module 100 is operating in pressure mode or vacuum mode. In pressure mode (FIG. 5D), air from blowers 306 passes through pressure chamber 302 and output air port 309B into valve 500, through end cap 305 and system air port 702 into tubing 15, while ambient air from outside module 100 flows into vacuum chamber 303 through intake air port 309A to replace it. In pressure mode (FIGS. 5C, 5D), magnet 401 is disposed at "12-o'clock" position P1 (FIG. 5C). In this mode, module 100 injects air into tubing 15 to propel carrier 32 away from module 100, sending carrier 32 to satellite terminal 18.

Alternately, when module 100 is operating in vacuum mode (FIGS. 5E, 5F), baffle 505 is disposed on the opposite side of valve 500, and magnet 401 is at "6-o'clock" position P2 (FIG. 5E). In the resulting vacuum mode, air is drawn by blowers 306 from tubing 15 through system air port 702 and end cap 305 through valve 500 and intake air port 309A into vacuum chamber 303. The air then is pumped by blowers 306 into pressure chamber 302 and through output air port 309B, where it is diverted by blocking baffle 505 outside system 10 through valve housing 700. In vacuum mode, module 100 draws air out of tubing 15 to create a vacuum therein, dropping internal pressure of tubing 15 below that of outside ambient air. This creates the pressure differential discussed above which draws carrier 32 toward module 100, returning carrier 32 to primary terminal 16 from satellite terminal 18.

In both modes, as carrier 32 nears its destination, controller 304 may rotate baffle 505 to partially cover both pressure chamber 302 and vacuum chamber 303, thus blending air from both chambers and reducing the pressure differential across carrier 32 to achieve the "soft landing" discussed above. Specifically, as baffle 505 rotates from fully covering vacuum chamber 303 (FIGS. 5C, 5D) toward fully covering pressure chamber 302 (FIGS. 5E, 5F), some of the effluent air from pressure chamber 302 is diverted either outside module 100 or back into vacuum chamber 303, thus reducing the pressure in tubing 15.

The concomitant rotation of magnet 401 from 12-o'clock position P1 toward 6-o'clock position P2 or back again mixes air flow between pressure chamber 302 and vacuum chamber 303 to create a neutralizing effect of air flow through end cap 305. The balance of pressure and vacuum reduces the pressure in tubing 15, and carrier 32 slows in its propagation toward its destination. In this embodiment, however, module 100 never ceases to pneumatically communicate with tubing 15.

Figure 6:
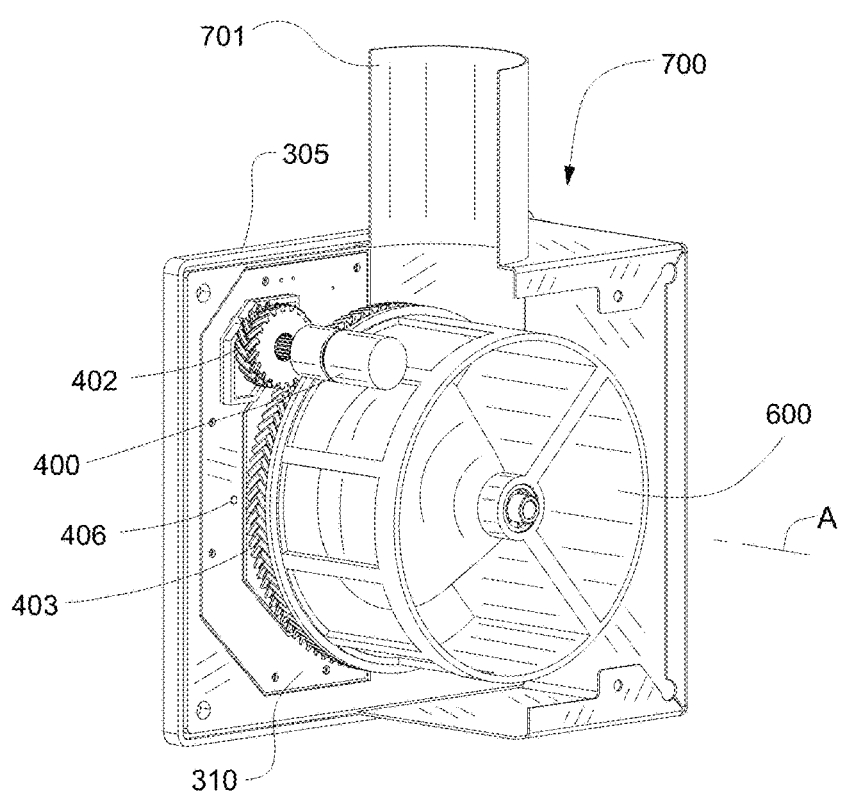

Turning now also to FIGS. 6-6H and 11C, another particular valve 600 includes a third, "blocking" mode which isolates module 100 from tubing 15 altogether. As with valve 500 discussed above, valve 600 works similarly in pressure and vacuum modes. In FIGS. 6C, 6D, magnet 401 is at 12-o'clock (P1) and air pass through port 601 is aligned with pressure chamber 302, permitting blowers 306 to inject air into tube 15 through end cap 305. Baffle 605 diverts air flow into intake air port 309A, causing blowers 306 to draw ambient air into vacuum chamber 303 through valve housing 700 to replace it. In FIGS. 6G, 6H, magnet 401 is at 6-o'clock (P2) and air pass through port 601 is aligned with vacuum chamber 303, causing blowers 360 to draw air from tube 15 through end cap 305 and intake air port 309A and into vacuum chamber 303, while baffle 605 diverts pressurized air from blowers 306 and output air port 309B to be vented outside module 100 through valve housing 700.

FIGS. 6E, 6F depict said blocking mode, whereby magnet 401 is displaced at position P3 a quarter turn from either 12 o'clock (P1) or 6 o'clock (P2). In blocking mode, baffle 605 isolates end cap 305 and tubing 15 from both vacuum chamber 303 and pressure chamber 302, causing air flowing through blowers 306 to be drawn into air chamber 102 through intake air port 309A and into vacuum chamber 303 through valve housing 700. Simultaneously (FIG. 6F), air expelled by blowers 306 passes through output air port 309B to be vented out valve housing 700 to outside ambient air.

The described blocking mode may be used, for example, for closing tube 15 to effect the soft landing discussed above. When carrier 32 is propelled toward satellite terminal 18 and away from primary terminal 16 and module 100, blocking mode prevents more air being injected into tube 15. The volume of tube 15 remains the same, but the portion of tube 15 on the primary terminal 16 side of carrier 32 increases as carrier 32 moves further away from primary terminal 16. This causes the air pressure on the primary terminal 16 side of carrier 32 to drop, effectively slowing carrier 32. Similarly, when carrier 32 is traveling away from satellite terminal 18 and toward primary terminal 16, placing valve 600 into blocking mode traps air on the primary terminal 16 side of carrier 32, causing the air pressure to increase as carrier 32 nears its destination, thereby slowing carrier 32 and effecting the aforementioned soft landing in primary terminal 16.

Operation

Figure 8:
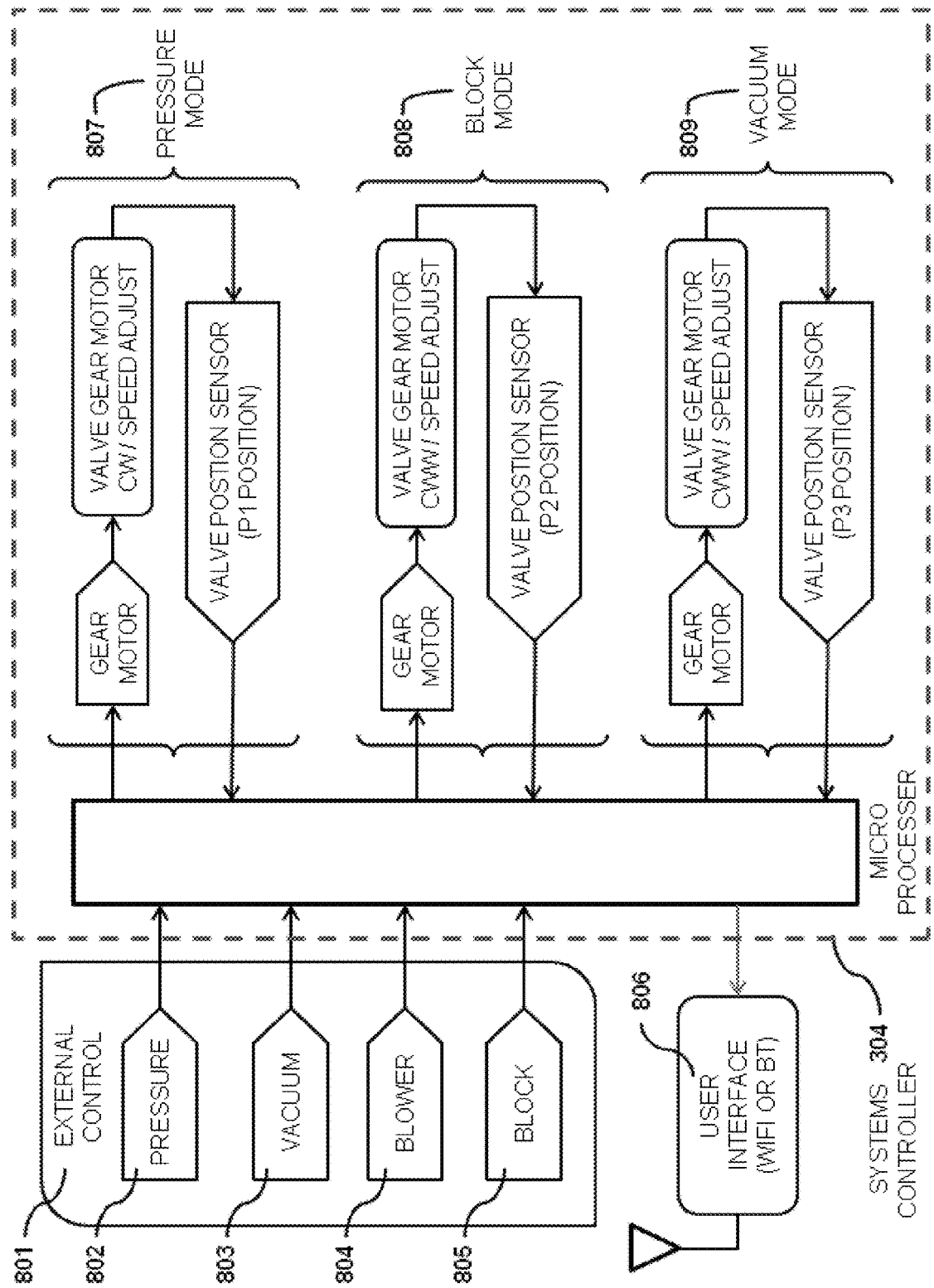
FIG. 8 is a block diagram of one process of operation of the blower module of FIG. 1.

FIG. 8 further illustrates the process just described in block diagram form. FIG. 8 represents flow of process signals, received from outside sources, for controlling pressure and vacuum air flow direction and timing during operation of system 10. Such outside sources may, for example, comprise a managing software module (not shown) tracking carrier 32 through tubing 15, including its weight and speed, ambient air temperature and pressure, and the aforementioned feedback sensor pickups 405, 406, 407 to determine the position of magnet 401 on valves 500, 600.

Pressure signal input 802 is translated to valve pressure position mode 807 with the system control function 806 and sets valves 500, 600 to rotate magnet 401 using DC gear motor 400 to the P1 position. In the P1 position, pass through opening areas 501, 601 align with pressure chamber 302, opening output air port 309B through to end cap 305 and into tubing 15 while simultaneously blocking vacuum chamber 302 from tubing 15 and opening vacuum chamber 302 to outside air through housing 700. This corresponds to alignment of magnet 401 with feedback sensor pickup 405 at the 12 o'clock position (FIG. 5C).

Similarly, vacuum signal input 803 may be translated to valve vacuum position mode 809 with system controller 304 and valves 500, 600 to rotate magnet 401 using DC gear motor 400 to the P2 position. In the P2 position, pass through openings 501, 601 align with vacuum chamber 303, opening intake air port 309A through end cap fixture 305 and into tubing 15 while venting pressurized air from pressure chamber 302 outside module 100 through housing 700. This corresponds to alignment of magnet 401 with feedback sensor pickup 407 at the 6 o'clock position (FIG. 5E).

Blower signal input 804 transmits blower motor 306 duty cycle to system controller 304 after either pressure signal input 802 is transmitted to valve pressure position mode 807 within system controller 304 or vacuum signal input 803 is transmitted to valve vacuum position mode 809 within controller 304. Blower signal input 804 also can transmit to system control 806 that it is to end the blower motor 306 cycle time. Block signal input 805 transmits valve block position mode 808 within system controller 304 and directs air valve 600 to rotate magnet 401 using DC gear motor 400 to the P3 position. In the P3 position, pass through opening area 601 of valve 600 aligns with neither of air ports 309A, 309B, thereby blocking end cap 305 and preventing air flow into or out of tubing 15. This corresponds to alignment of magnet 401 with feedback sensor pickup 406 at the 3 o'clock position P3 (FIG. 6E).

User interface 806 permits user override of the automated system controller 304 operation of system 10 described above. Signal 806 transmits to system controller 304 system status and data logging via any type of RF interface such as WIFI or Bluetooth, or physically on a user interface panel (e.g., FIG. 9A) provided for the purpose on or near primary terminal 16. For example, user interface 806 may include the SEND and RETURN signals manually input by customers and business personnel using terminals 18, 16, respectively, of system 10. Alternately, user interface 806 may be used for software updates, system 10 maintenance or the like.

Referring now also to FIGS. 12A-13C, operational diagrams for pressure, vacuum, reset and error modes are illustrated. FIGS. 12A-12D show pressure, vacuum, blocking and error cycle diagrams, while FIGS. 13A-13C illustrate the duration of signal pulses sent to physical components of module 100.

Figure 12A:
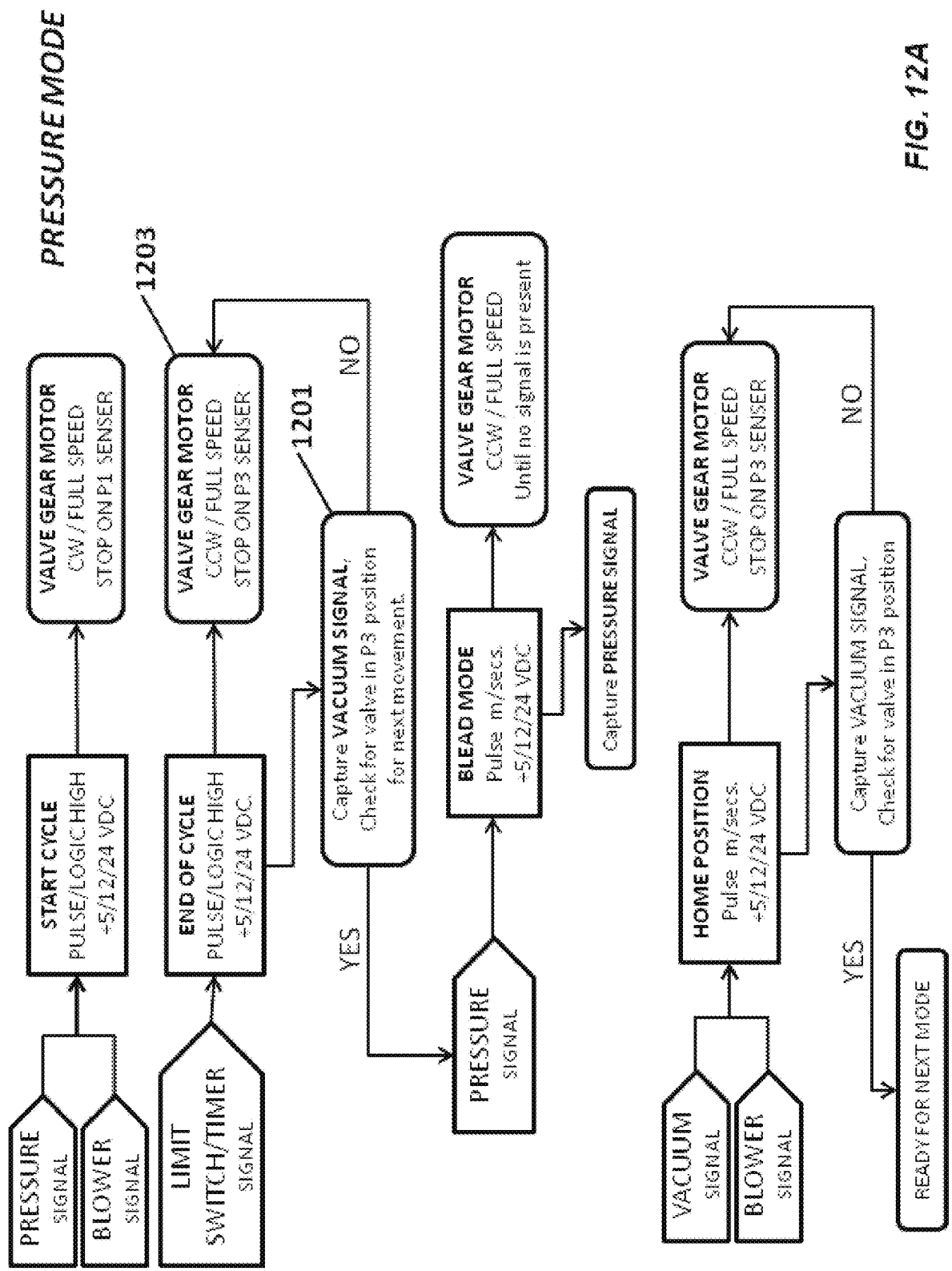
FIGS. 12A-12D illustrate pressure, vacuum and blocking cycles and error modes during operation of the blower module of the present invention.

FIGS. 12A, 13A illustrate the input signals needed for pressure mode. To start a pressure cycle, controller 304 applies a positive (+VDC) direct current voltage, or pulse signal, from external customer control signal 200 onto pressure input signaling line.

As used herein, +VCD is understood to indicate that a positive voltage above +0 VDC is indicated. Controller 304 is adapted to accept signals at various operating voltages which typically range from +5 VDC to +24 VDC, but are not so limited. One having ordinary skill in the art will recognize that herein a +VDC indicates the select operating customer control signal voltage of signal port 200, and that all such alternatives are considered to be within the scope of the present invention.

Further, one having ordinary skill in the art will recognize that a feedback sensor pickup 405, 406, 407 "being at +VDC" as used herein indicates that magnet 401 has rotated into position P1, P3, P2, juxtaposed to said feedback sensor pickup 405, 406, 407, respectively, thus inducing said +VDC into said feedback sensor pickup 405, 406, 407, and further indicating that valve 500 is in one of said nominal positions P1, P3, P2.

Continuing now with FIGS. 12A, 13A system controller 304 checks 1201 position sensor 407 to see if it is at +VDC, indicating that valve 500 is not in the P1 position. If so, controller 304 turns valve gear motor 400 to rotate valve 600, 500 clockwise until position sensor 407 is not at +VDC, indicating that valve 500 has moved into the P1 position. The pressure cycle then can start. The P1 position allows air flow to enter into vacuum chamber 303 from valve housing 700, admitting ambient air into pressure chamber 302 to primary terminal 16. See FIG. 11B. When signal 200 (from limit switch or pressure input signaling line from customer control) goes to +0 VDC, signal input (capture signal) indicates the end of the pressure cycle (see FIG. 13A).

Figure 12B:
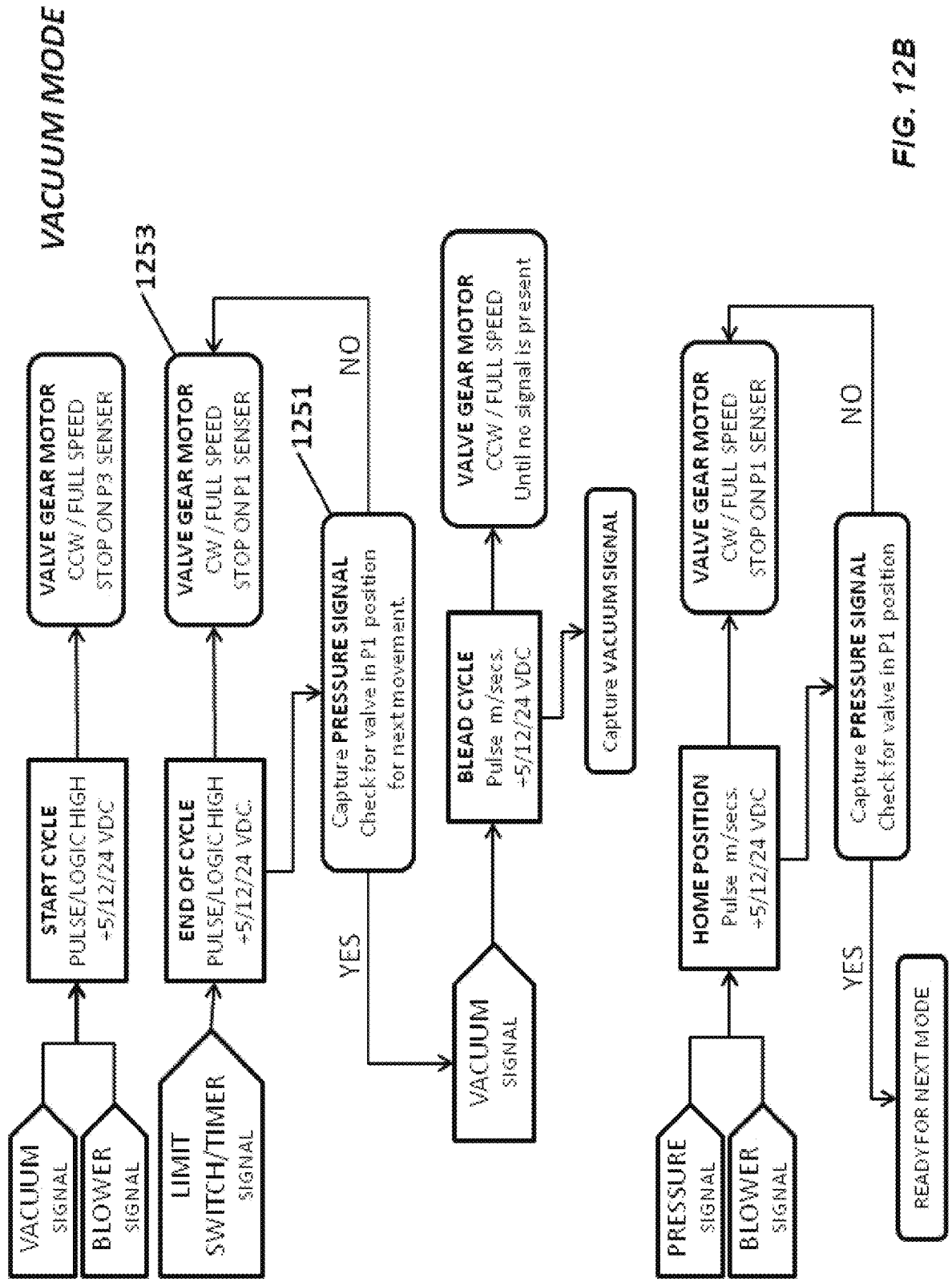

FIGS. 12B, 13B illustrate the input signals needed for vacuum mode. To start a vacuum cycle, controller 304 checks 1251 position sensor 405 to see if it is at +VDC, indicating that valve 500 is not in the P2 position. If so, controller 304 causes valve gear motor 400 to rotate counter clockwise to position sensor 407 (P2). If P2 is at +VDC, valve 600, 500 is in position to allow air flow to enter vacuum chamber 303, through pressure chamber 302, and out to ambient air through valve housing 700. The vacuum cycle then can start. The P2 position allows air flow to enter into vacuum chamber 303 from to primary terminal 16 through system air port 702, admitting system air into vacuum chamber 303, through pressure chamber 302 and out to ambient through valve housing 700. See FIG. 11A. When signal 200 (from limit switch or pressure input signaling line 200) goes to +0 VDC, signal input (capture signal) indicates the end of the vacuum cycle (see FIG. 13A).

Figure 12C:
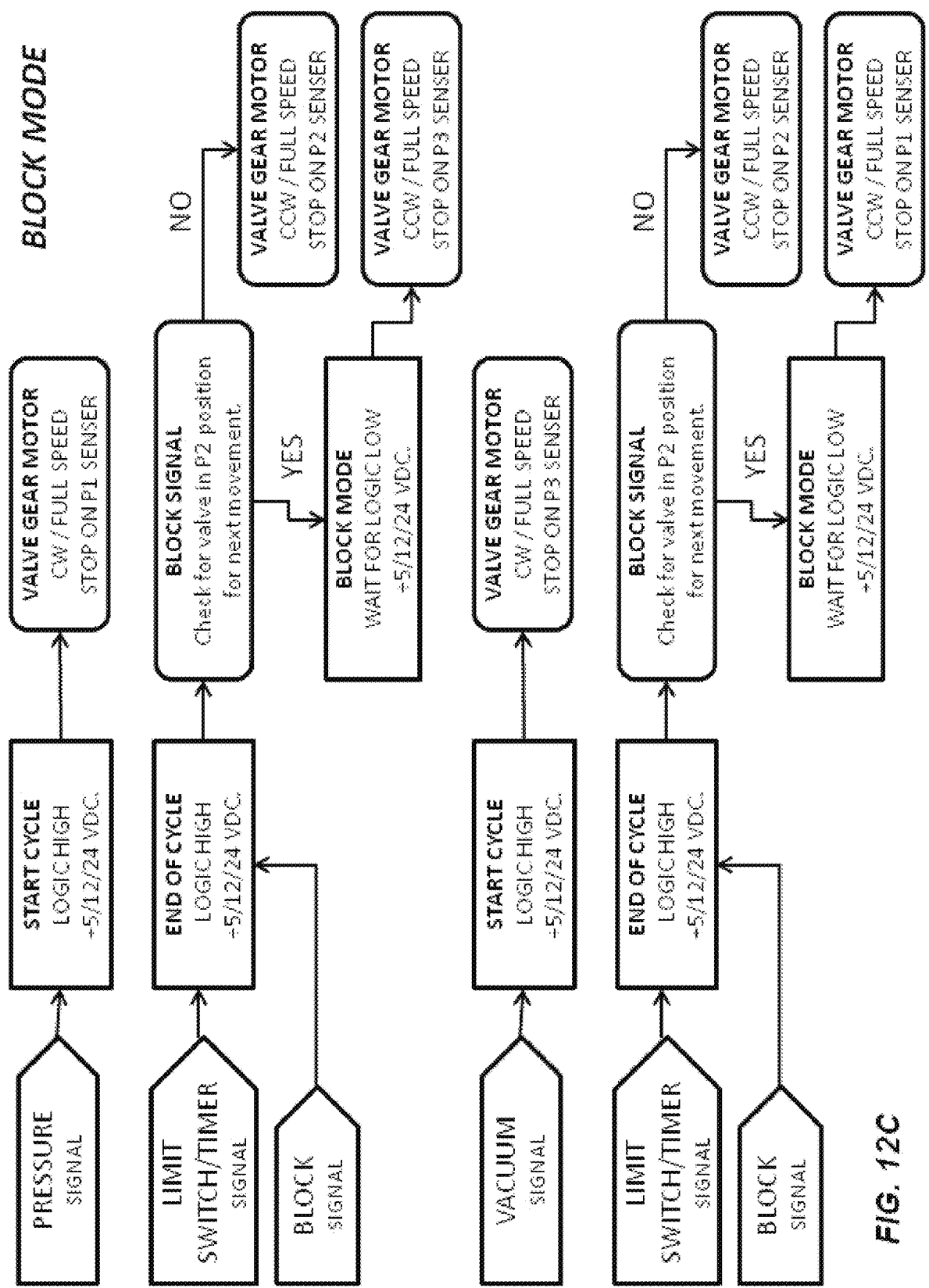
Figure 12D:
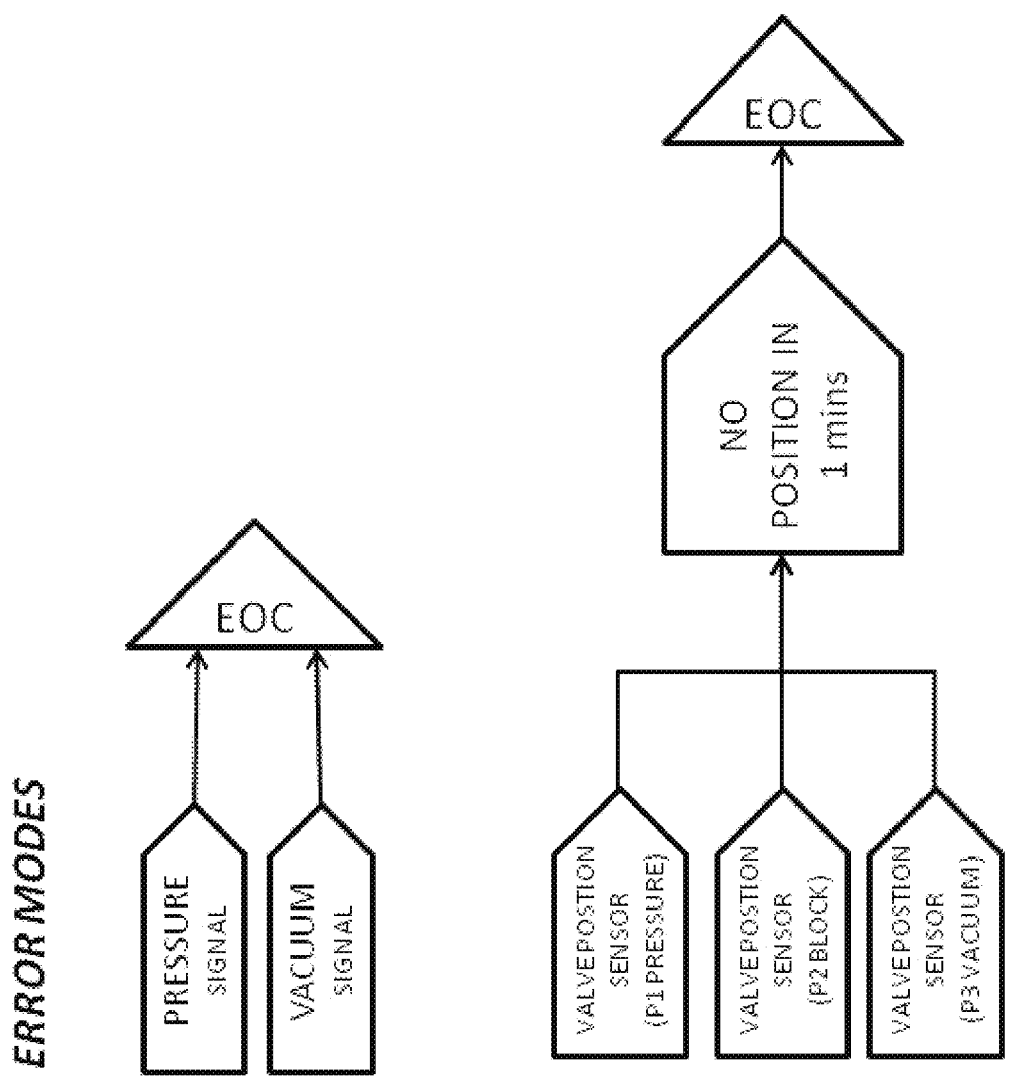

FIG. 12C illustrates the input signals needed for blocking mode (using valve 600). Controller 304, applies a +VDC or pulse signal to the vacuum line signaling, from external customer control signal 200, and checks position sensor 406 (P3) to see if it is at +VDC. If not, controller 304 rotates valve gear motor 400 counter clockwise to align magnet 401 with feedback sensor pickup 406 to impose a +VDC on sensor 406. This signals controller 304 that valve 600, 500 is in blocking mode (P3). Ambient air flow then enters vacuum chamber 303 from, passes through pressure chamber 302, and back out through valve housing 700 without entering system 10.

A customer may encounter reasons to reset the cycles of system 100. A customer operating customer control signal 200 can reset the system by cycling the customer control power button (see FIG. 9A). There is no feedback line to system controller 304; this mode can be used as a local reset. FIG. 13C illustrates the input signals for doing so. To reset system 100, a pressure signal of +VDC pulse of 1 sec. from customer's control signal 200 coupled with no blower signal 804, causes system controller 304 to reset. Valve Gear Motor 400 rotates clockwise to pressure position P1 and stops. This readies the system for a new cycle. The pressure pulse signal is the only signal used by system controller 304 for reset.

Summary

As described above in one or more particular embodiments, blower module 100 provides an efficient and reasonable cost alternative to legacy tube carrier system blower systems. Blower module 100 may serve either as replacements for such legacy blowers or in new system 10 construction. Idled blowers 306 are not required to rotate backwards as in some legacy systems, conserving blower 306 useful life. Having both pressure chamber 302 and vacuum chamber 303 integral to one chassis minimizes blower system air flow impedence, saves space, requires less weight and minimizes cost of components.

While the invention has been particularly shown and described with reference to one or more particular embodiments, it will be understood by those skilled in the art that various changes in form and detail may be made therein without departing from the scope of the invention. For example, air chamber 300 has been depicted as rectangular and divided longitudinally by planar partition 308 to create pressure and vacuum chambers 302, 303. Chambers 300, 302, 303 could instead, however, be arranged concentrically around axis A, separated by a tubular partition (not shown) with blowers 306 arrayed radially inward through said tubular partition toward axis A. Further, blowers 306 have been depicted as arranged transverse to axis A, but they could be canted in one direction or another relative to axis A, perhaps to enhance laminar air flow toward air control valve housing 700. Still further, magnet 401 has been discussed as a ferrous permanent magnet, but other types of magnets could be used, including an electromagnet.

I claim:

1. A blower module for a pneumatic carrier transport system comprises an air chamber coupled to said carrier transport system and having a longitudinal axis, a pressure chamber having an air outlet port, and a vacuum chamber having an air intake port;

at least one blower disposed within said air chamber and coupled between said pressure chamber and said vacuum chamber;

a valve housing coupled between said air chamber and said carrier transport system and having ambient air access means;

a valve disposed within said valve housing, said valve having an air pass-through port coupled to said air intake port and said air outlet port;

a baffle disposed within said air pass-through port and adapted to direct air passing through said air pass-through port selectively between said air intake port, said air outlet port, said ambient air access means and said carrier transport system; and valve control means for controlling said valve to regulate air flowing into and out of said air chamber.

2. The blower module of claim 1 wherein said ambient air access means comprises a perforated grid surrounding at least a portion of said valve housing, said perforated grid disposed between said valve and said ambient air.

3. The blower module of claim 1 and wherein said valve control means comprises valve position indicator means;

valve position changing means; and a system controller electrically coupled to said valve position indicator means and said valve position changing means, said system controller adapted to rotate said valve selectively to direct air between said air intake port, said air outlet port, said ambient air access means and said carrier transport system.

4. The blower module of claim 3 wherein said valve position indicator means comprises a magnet disposed on said valve; and a plurality of magnetic position sensors disposed within said valve housing at a plurality of select sensor positions around said longitudinal axis, said magnetic position sensors adapted to detect and communicate to said system controller a proximity of said magnet to each one of said magnetic position sensors.

5. The blower module of claim 3 wherein said valve position changing means comprises a gear coupled to a perimeter of said valve; and a step motor coupled to said gear and adapted to rotate said valve selectively to position said magnet at one of said plurality of select sensor positions.

6. The blower module of claim 1 wherein said pressure chamber and said vacuum chamber are substantially equal in volume.

7. The blower module of claim 1 wherein said air chamber includes a partition dividing said air chamber into said pressure chamber and said vacuum chamber; and said at least one blower further includes a blower output end disposed within said pressure chamber and an opposite blower intake end disposed within said vacuum chamber.

8. The pressure and vacuum blower module of claim 7 wherein said partition is coaxial with said air chamber.

9. The pressure and vacuum blower module of claim 7 wherein said pressure chamber and said vacuum chamber are substantially symmetric about said longitudinal axis.

10. The blower module of claim 1 and wherein said baffle is coaxial with said longitudinal axis.

11. The blower module of claim 1 and wherein said baffle covers one half of said air pass-through port.

12. The blower module of claim 1 and wherein said baffle covers greater than one-half of said air pass-through port.

13. The blower module of claim 12 and wherein said baffle covers three-fourths of said air pass-through port.

14. A pressure differential generator module for a pneumatic carrier transport system, said pressure differential generator module comprising an air chamber having a longitudinal axis, a pressure chamber having an air outlet port and a vacuum chamber having an air intake port;

at least one blower disposed within said air chamber and coupled between said pressure chamber and said vacuum chamber;

a valve housing coupled between said air chamber and said carrier transport system, said valve housing having ambient air access means;

a cylindrical valve disposed within said valve housing coaxial with said longitudinal axis, said valve having an air pass-through port coupled to said air intake port and said air outlet port;

a baffle disposed within and covering a portion of said air pass-through port;

a valve position control system having a magnet coupled to said valve; and a plurality of magnetic position sensors disposed within said valve housing at a plurality of select sensor positions around said longitudinal axis;

a gear coupled to a perimeter of said valve;

a step motor coupled to said gear and adapted to rotate said valve selectively to position said magnet at one of said plurality of select sensor positions; and a system controller electrically coupled to said valve position indicator means and said valve position changing means, said system controller adapted to rotate said valve selectively to direct air between said air intake port, said air outlet port, said ambient air access means and said carrier transport system.

15. A pressure differential generator module comprising an air chamber having a longitudinal axis, a pressure chamber and a vacuum chamber, and module output means;

at least one blower disposed within said air chamber and coupled between said pressure chamber and said vacuum chamber;

a valve coupled coaxially to said air chamber and adapted to rotate about said longitudinal axis and having an annular perimeter;

an air pass-through port coupled to said pressure chamber and said vacuum chamber; and a baffle disposed within and covering a portion of said air pass-through port; and ambient air access means;

a valve position control system coupled to said valve; and a system controller electrically coupled to said valve position control system, said controller adapted to operate said valve position control system to rotate said valve selectively to direct air between said pressure chamber, said vacuum chamber, ambient air access means and said module output means.

16. The pressure differential generator module of claim 15 wherein said ambient air access means comprises
   a valve housing surrounding said valve; and
   a perforated grid surrounding at least a portion of said valve housing, said perforated grid disposed between said valve and said ambient air.

17. The pressure differential generator module of claim 15 wherein said valve position control system comprises
   a magnet disposed on said valve;
   a plurality of magnetic position sensors disposed at a plurality of select sensor positions around said longitudinal axis; and
   a step motor having a drive gear coupled to said annular perimeter
wherein said system controller receives valve position indications from said magnetic position sensors and operates said step motor to position said magnet at select angular positions around said longitudinal axis corresponding to said select sensor positions.

18. The pressure differential generator module of claim 15 wherein said module output means comprises
   a port coupled between said valve opposite said air chamber and a pneumatic carrier transport system, said port adapted to be coupled selectively to said pressure chamber and said vacuum chamber in response to said system controller operating said valve position control system.

19. A method of operating a pneumatic carrier transport system, said system having at least one carrier tube coupled between an originating terminal and a target terminal, the system further having at least one movable carrier adapted to propagate through said carrier tube, the method comprising
   providing
      a pressure differential generator module coupled to said originating terminal and having
         an air chamber having a longitudinal axis, a pressure chamber and a vacuum chamber;
         at least one blower disposed within said air chamber and coupled between said pressure chamber and said vacuum chamber;
         a valve coupled coaxially to said air chamber and adapted to rotate about said longitudinal axis and having an annular perimeter, an air pass-through port coupled to said pressure chamber and said vacuum chamber, a baffle disposed within and covering a portion of said air pass-through port; and ambient air access means;
   providing
      a valve position control system coupled to said valve; and
   providing
      a system controller electrically coupled to said valve position control system; then
   operating said system controller to direct said valve position control system to rotate said valve selectively to direct air between said pressure chamber, said vacuum chamber, said ambient air access means and said originating terminal.

20. The method of claim 19 wherein said valve position control system comprises
   a magnet mounted to said valve and adapted to rotate with said valve;
   a plurality of magnetic position sensors disposed at a plurality of select sensor positions around said longitudinal axis; and
   a step motor having a drive gear coupled to said annular perimeter
wherein said system controller receives valve position indications from said magnetic position sensors and operates said step motor to position said valve at select angular positions around said longitudinal axis corresponding to said select sensor positions.

21. The method of claim 19 wherein said ambient air access means comprises
   a valve housing surrounding said valve; and
   a perforated grid surrounding at least a portion of said valve housing, said perforated grid disposed between said valve and said ambient air.

22. The method of claim 19 wherein operating step further comprises
   alternately rotating said valve to position said baffle to
      couple said pressure chamber to said originating terminal and said vacuum chamber to said ambient air access means; and
      couple said vacuum chamber to said originating terminal and said pressure chamber to said ambient air access means.

23. The method of claim 22 and further comprising
selectively rotating said valve to position said baffle to
   couple a portion of said pressure chamber to said ambient air access means; and
   couple a portion of said vacuum chamber to said ambient air access means whereby said pressure and vacuum within said carrier transport system are reduced, thereby slowing movement of said carrier within said carrier transport system.

\* \* \* \* \*